US007667828B2

(12) United States Patent
Gibson

(10) Patent No.: US 7,667,828 B2
(45) Date of Patent: Feb. 23, 2010

(54) TAGGING SYSTEMS USING ENERGY EXCHANGE

(75) Inventor: Gary A. Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 338 days.

(21) Appl. No.: 11/888,527

(22) Filed: Jul. 31, 2007

(65) Prior Publication Data

US 2009/0033932 A1 Feb. 5, 2009

(51) Int. Cl.
*G06K 9/74* (2006.01)

(52) U.S. Cl. ........................................ 356/71; 235/491

(58) Field of Classification Search .................. 356/71, 356/417; 235/491
See application file for complete search history.

(56) References Cited

U.S. PATENT DOCUMENTS

| | | | | |
|---|---|---|---|---|
| 6,570,648 | B1 * | 5/2003 | Muller-Rees et al. | 356/71 |
| 6,846,565 | B2 * | 1/2005 | Korgel et al. | 428/402 |
| 6,918,946 | B2 * | 7/2005 | Korgel et al. | 75/362 |
| 7,008,559 | B2 * | 3/2006 | Chen | 252/301.6 S |
| 7,501,092 | B2 * | 3/2009 | Chen | 422/53 |
| 2003/0003300 | A1 * | 1/2003 | Korgel et al. | 428/402 |
| 2003/0034486 | A1 * | 2/2003 | Korgel | 257/13 |
| 2005/0243305 | A1 * | 11/2005 | Vig et al. | 356/71 |
| 2005/0266697 | A1 * | 12/2005 | Korgel et al. | 438/758 |
| 2005/0267345 | A1 * | 12/2005 | Korgel et al. | 600/317 |
| 2009/0074649 | A1 * | 3/2009 | Korgel et al. | 423/349 |

OTHER PUBLICATIONS

Bockstaller, M. et al., "Size-Selective Organization of Enthalpic Compatibilized Nanocrystals in Ternary Block Copolymer/Particle Mixtures" J Am Chem Soc 125:5276-5277 (2003).

Shevchenko, Elena et al, "Structural Diversity in Binary Nanoparticle Superlattices" Nature Letters vol. 439, 55-59 (2006).

* cited by examiner

*Primary Examiner*—Roy Punnoose

(57) ABSTRACT

A tagging system contains first taggants and second taggants. The taggants differ from each other so that the first taggants have a first emission spectrum and a first absorption edge and the second taggants have a second emission spectrum and a second absorption edge. In the tagging system, the first taggants are arranged to be within an interaction distance of the second taggants so that energy transfer between the first taggants and the second taggants causes an emission spectrum of the tagging system to differ from a sum of the first emission spectrum and the second emission spectrum.

21 Claims, 3 Drawing Sheets

TAGGING SYSTEMS USING ENERGY EXCHANGE

BACKGROUND

Secure labeling or tagging of items is important for tracking of the items and prevention of counterfeiting. Some uses of secure tagging include identifying, authenticating, tracking, or validating documents, pharmaceuticals, consumer goods, and high value components and encoding of information on such items.

One technique for tagging items is to encode information using luminescent taggants. Semiconductor nanocrystals, for example, can be tailored to fluoresce and emit a narrow band of light centered at a tuned frequency. The size, shape, and materials chosen for a nanocrystal generally determines the emission properties of the nanocrystal and the frequencies emitted. Examples of size-tunable nanocrystals with narrow tunable spectra include particles of II-VI semiconductor materials such as CdSe, CdS, and CdTe and particles of III-IV semiconductor materials such as InP, GaP, and GaN. Composite particles consisting of, for example, wide bandgap shells such as ZnS surrounding smaller bandgap cores, such as CdSe, are also frequently employed. FIG. 1 shows plots 110 to 150 of emission spectra of CdSe/ZnS core-shell particles with a range of diameters between about 2 nanometers and 5 nanometers to illustrate how the proper selection of the size of the nanocrystals can provide a desired narrow-band emission.

Narrow-band taggants can be placed in marks that encode information in the form of the emission spectra and the spatial locations of the marks. For example, various combinations of nanocrystals can be placed in a series of locations or marks on an object to encode information. A reading device can illuminate the taggants with a wavelength of light that stimulates the emission from the nanocrystals and then spectrally analyze the resulting emissions to decode the information. For example, a particular code sequence could consist of nanocrystals that emit light within a narrow band in the green portion of the spectrum at a first location on an item, blue-emitting nanocrystals at a second location on the item, and red-emitting nanocrystals at a third location on the item, and the green-blue-red combination can be interpreted to have a particular data value. More generally, any number of locations and combinations of nanocrystal types can be used for encoding the data.

Manufactured tagging systems can have complicated emission spectra instead of narrow band spectra. Examples of suitable material for taggants with complex emission spectra include doped garnets such as yttrium-aluminum-garnet (YAG) doped with rare earths such as europium. Alternatively, nanocrystals that have narrow band emission spectra can be combined to produce tagging systems with complex emission signatures. These complex emission spectra can be advantageous in preventing counterfeiting of marks because complicated spectral signatures are generally more difficult to replicate.

Most emission spectra, even complicated spectra, can be duplicated using appropriate combinations of nanocrystals with narrow emission lines. The emissions spectra 110 to 150 for CdSe/ZnS particles, for example, illustrate a set of the narrow-band spectra that can be used as a basis set that when used in different combinations and relative proportions can match a wide range of arbitrary spectra. Changing the excitation wavelength used for a reading process can make counterfeiting more difficult because the emission spectrum of a taggant such as a nanocrystal of a particular type will typically depend upon the wavelength or wavelengths used to stimulate the emission. Thus, if a combination of nanocrystals of another material is chosen that matches the emission spectrum of a mark under illumination by one wavelength, the combination may fail to provide the correct readout spectrum when excited by a different wavelength. However, if the nanocrystals are non-interacting, the differences in emission as a function of stimulating wavelength can often still be duplicated using an appropriate combination of nanocrystals and counterfeiting is often possible.

SUMMARY

In accordance with an aspect of the invention, a tagging system contains multiple types of taggants that differ from each other. For example, first taggants can have a first emission spectrum and a first absorption edge, and second taggants can have a second emission spectrum and a second absorption edge. In the tagging system, the first taggants can be arranged to be within an interaction distance of the second taggants so that energy transfer between the first taggants and the second taggants causes an emission spectrum of the tagging system to differ from a sum of the first emission spectrum and the second emission spectrum.

BRIEF DESCRIPTION OF THE DRAWINGS

Use of the same reference symbols in different figures indicates similar or identical items.

DETAILED DESCRIPTION

Figure 1:
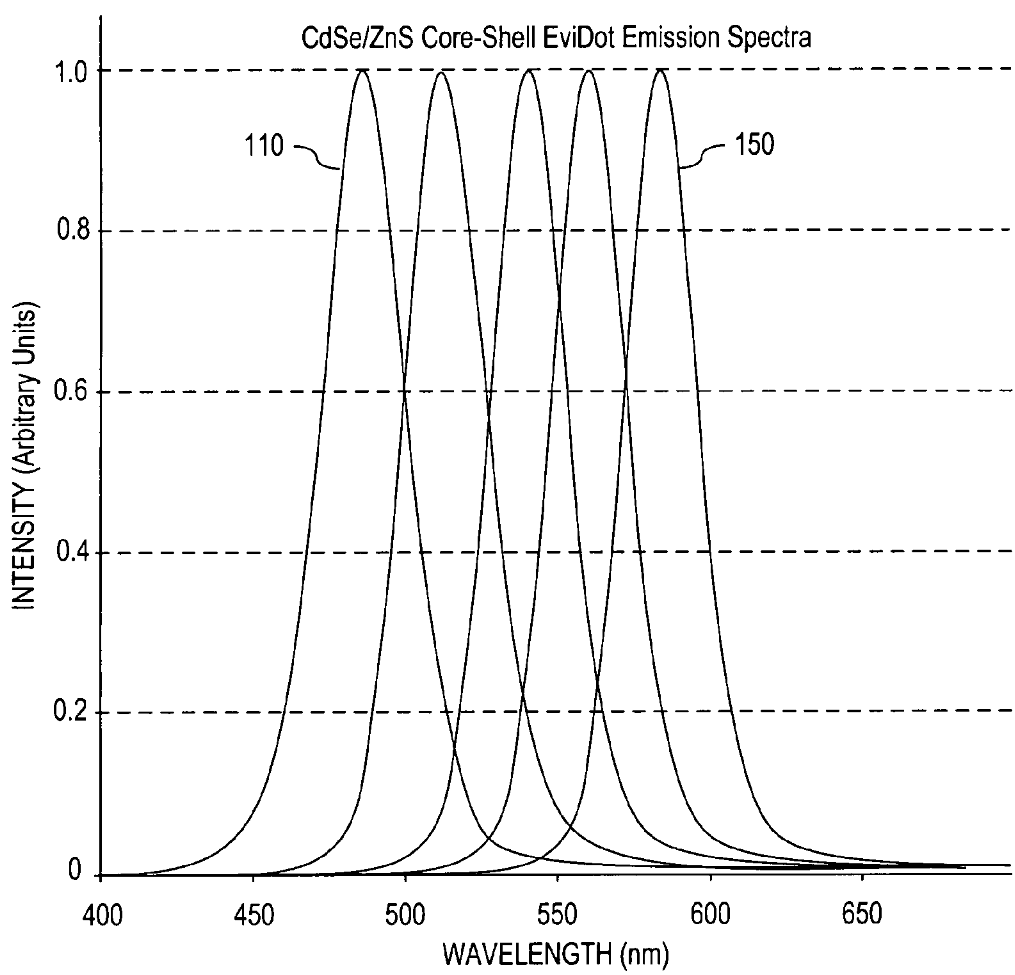
FIG. 1 shows narrow spectral distributions of emitted light from semiconductor particles of different sizes.

In accordance with an aspect of the invention, tagging systems and techniques can provide high security using combinations of taggants such as semiconductor nanocrystals spaced to create energy transfers between the taggants. The energy transfers between nanocrystals of different sizes or materials can change the emission response of the tagging system in a manner that is highly dependent on the illuminating wavelength. This makes counterfeiting more difficult because a successful counterfeit tagging system would need to match spectral responses across a range of illuminating frequencies. Such matching is more difficult when interacting taggants are used because it requires duplicating the interaction in addition to duplicating the emission characteristics of the isolated taggants. Duplicating the interaction for multiple excitation wavelengths can require placing the interacting taggants in the correct relative positions. This positioning can be difficult because proper positioning may depend on details of the manufacturing process such as temperature, pressure, applied electric or magnetic fields, and type of solvents used, and may rely on self-organization or phase-segregation phenomena that are difficult to mimic without using exactly the same manufacturing process. Further, the specific illuminating frequencies used for reading and identifying information represented by the tagging system can be varied or secret, so that counterfeiters would have difficulties determining the spectral response that they need to reproduce.

In accordance with a further aspect of the invention, tagging techniques can provide high encoded data density. In particular, the magnitudes or levels of emission spectra at specific frequencies can be controllably enhanced or depleted for different illuminating frequencies, thereby providing a greater number of distinguishable states per tagged location. In contrast, the data density of some known tagging techniques is limited by the width of the luminescent wavelength ranges that can be produced with nanocrystals and the ability of detectors to resolve wavelength differences.

In accordance with yet another aspect of the invention, secure tagging techniques can provide high signal-to-noise ratios. In particular, encoding of data can be based on differences in spectral response of taggants for different illuminating frequencies. Illuminating taggants with two or more frequencies allows comparisons of measurements to eliminate sources of noise. In contrast, current techniques may be limited by the ability of detectors to discriminate absolute levels of luminescent emission intensity, which can be a noisy process because of variations in the absorption of stimulating radiation and the collection of the luminescent light.

Finally, the present invention offers the possibility of better security for encoded data because techniques for proper reading of encoded information may require use of multiple illuminating frequencies that may be difficult for an eavesdropper to identify.

Figure 2:
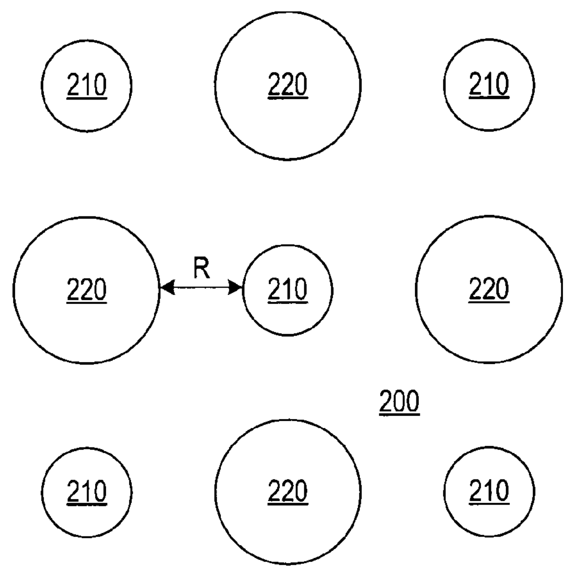
FIG. 2 illustrates a distribution of particles in a tagging system in accordance with an embodiment of the invention that uses energy transfers between the particles to select an emission spectrum of the tagging system.

FIG. 2 illustrates an example of a tagging system 200 including two types of taggants 210 and 220 that are arranged to enable energy transfers between taggants of different types. Each energy transfer results when an interaction of a donor taggant and an acceptor taggant causes the donor taggant to transition from an excited quantum state to a lower energy quantum state and the acceptor taggant to transition from a lower energy quantum state to an excited quantum state. In an exemplary embodiment, taggants 210 and 220 are semiconductor nanocrystals, and taggants 210 differ in size or material composition from taggants 220. For example, taggants 210 or 220 may be particles of II-VI semiconductor materials such as CdSe, CdS, and CdTe, particles of III-IV semiconductor materials such as InP, GaP, and GaN, or composite particles containing, for example, wide bandgap shells surrounding smaller bandgap cores as in the CdSe/ZnS core-shell particles described above. Such particles may be spherical with diameters with a range of diameters between about 1.5 nm and 20 nm or alternatively may be aspherical. Suitable semiconductor nanocrystals that luminescence in a band with a full width at half maximum (FWHM) of less than 30 nm can be readily produced by colloidal chemistry techniques known in the art. Alternatively, taggants 210 or 220 can be particles of a material such as a doped garnet (e.g., yttrium-aluminum-garnet (YAG) that is doped with rare earths such as europium) that produces a complex emission spectrum.

Taggants 210 are arranged to have a specific separation R between neighboring taggants 210 and 220. Separation R is controlled during manufacture of tagging system 200 to provide a desired rate of energy transfer between taggants 210 and 220 and to create desired emission spectra for desired excitation wavelengths. Some techniques for controlling the spacing of taggants are described further below.

Energy transfer between fluorescent taggants such as semiconductor nanocrystals (NCs) can result from several processes. One energy exchange process is a phenomenon commonly known as Förster exchange. Förster exchange, as described by T. Förster, Ann. Phys. 6, 55 (1948), involves the transfer of energy from an excited donor state in one particle or system to an acceptor state in another particle or system via an electromagnetic dipole-dipole interaction. The rate for Förster exchange generally depends on the donor-acceptor spectral overlap, the relative orientation of the donor and acceptor transition dipole moments, and the distance between donor and acceptor. The rate for Förster exchange generally falls as $1/R^6$, where R is the distance between donor and acceptor, and such exchange can typically occur over distances up to about 100 Å. In most cases, absorption of light emitted by a nanocrystal by another nanocrystal is a much less effective way of transferring energy than Förster exchange due to the relatively small cross-section for direct absorption. Dexter exchange (also known as collisional energy transfer) is another mechanism for transfer of energy between nanocrystals. Dexter exchange generally depends on a spatial overlap of donor and acceptor molecular orbitals and is therefore a short-range phenomenon. The interaction rate for Dexter exchange decreases exponentially with separation distance R. These exchange processes are highly dependent on the nanocrystal separation and require that the acceptor and donor nanocrystals be in close proximity.

The transition energy of the acceptor state must also be approximately equal to or lower than the transition energy of the donor state. Essentially, a spectral overlap between the donor's emission spectrum and the acceptor's absorption spectrum is required for energy exchange. In general, the acceptor needs to have at least one state close in energy to an emitting state in the donor. For this use, one of the desirable features of many of semiconductor nanocrystals is that they absorb strongly over a wide energy range above their first (lowest) excited energy state. For example, typical red-emitting nanocrystals will strongly absorb blue light (or green or UV light) and, therefore, there will be strong Förster coupling from blue to red-emitting nanocrystals.

Tagging system 200 in an exemplary embodiment is a binary mixture of two sizes of nanocrystals respectively corresponding to taggants 210 and 220. Smaller nanocrystals generally emit shorter light wavelengths due to the greater quantum size confinement of electron states in the nanocrystal. To provide an illustrative example, the following assumes that taggants 210 are smaller nanocrystals that emit only a narrow band of light in the blue portion of the visible spectrum and that taggants 220 are larger nanocrystals that emit in a narrow band of light in the red portion of the visible spectrum. This exemplary embodiment is used only as a specific illustration of some aspects of the invention, and more generally, taggants 210 and 220 can differ from each other in size, material composition, or any manner that allows energy transfers. Further, emission spectra of an isolated or non-interacting taggant 210 or 220 can be peaked at any frequency/wavelength, and taggants 210 and 220 may have narrow band emission spectra or complex emission spectra, as long as the requirements for energy transfer are satisfied.

The absorption edge of each type of taggant 210 or 220 is typically red-shifted by a few tens of nanometers relative to emission peak of taggant 210 or 220. The absorption edge is defined as the wavelength above which a taggant does not absorb light. Thus, if blue and red-emitting nanocrystals were in a non-interacting configurations (not the configuration of FIG. 2), light with a wavelength between the two absorption edges, for example, green light, would cause luminescence of only red light because green light can excite the red-emitting nanocrystals but cannot excite the blue-emitting nanocrystals. When stimulated with light of a wavelength shorter than either absorption edge, e.g., UV or blue light with a wavelength shorter than the absorption edge of blue-emitting nanocrystals, both types of nanocrystals will be stimulated and will emit light. As a result, a non-interacting configuration of nanocrystals 210 and 220 would emit both red and blue light when illuminated with light having a sufficiently short wavelength. The ratio of the intensity of red and blue light in the non-interacting configuration depends on the ratio of the numbers of nanocrystals 210 and 220, and the ability of each type of nanocrystal 210 or 220 to absorb the illumination.

One configuration of the exemplary embodiment of tagging system 200 positions nanocrystals 210 and 220 so that most of nanocrystals 210 are within an interaction distance, e.g., within a Förster radius, of a nanocrystal 220 of the other type. (The Förster radius can be defined as the donor-acceptor distance at which Förster exchange will occur 50% of the time.) With this configuration, the exemplary embodiment of tagging system 200 primarily emits red light because most of the energy captured in excitations of blue-emitting nanocrystals 210 will be transferred to red-emitting nanocrystals 220, and the resulting excitations of nanocrystals 220 produce red light (or more generally produce light having the spectral characteristic of taggants 220.) More generally, the average separation R can be chosen from a range of separations providing different levels or rates of energy transfer, and the relative intensity of red and blue light can be varied through selection of separation R. The range for separation R will have a scale set by the type of energy transfer interaction. For example, for Förster exchange, the separation R would be in a range with a scale set by the Förster radius and should be should roughly be of the same order of magnitude as the Förster radius.

Figure 3:
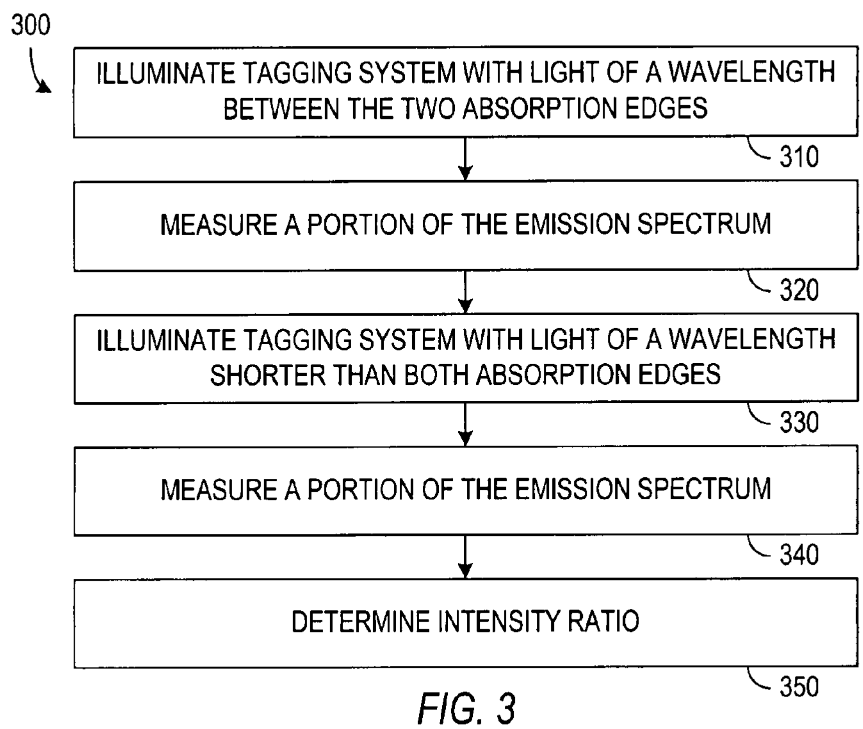
FIG. 3 is a flow diagram of a process for reading a tag in accordance with an embodiment of the invention.

FIG. 3 illustrates a process 300 for reading or authenticating the tagging system 200 of FIG. 2. Process 300 begins with a step 310 of illuminating tagging system 200 with light having a wavelength that is between the two absorption edges of nanocrystals 210 and 220, e.g., with green light in the exemplary embodiment. This illumination excites only one type of nanocrystals 220 and causes those nanocrystals 220 to emit red light. Step 320 measures at least a portion of spectra of the emitted light, for example, by measuring the intensity of light having the characteristic emission frequency of nanocrystals 220, but other frequencies can also be measured if desired during step 320.

Step 330 can then illuminate tagging system 200 with light (e.g., UV light) having a wavelength shorter than either absorption edge. The shorter wavelength light can excite both types of nanocrystals 210 and 220, but at least a fraction of the nanocrystals 210 having the higher transition energy are positioned to transfer excitation energy without emitting light having the characteristic frequency of nanocrystals 210, e.g., without emitting blue light. Further, the emissions from nanocrystals 220 in the interacting configuration can actually be enhanced, so that the emitted intensity is stronger than the emissions would be in the absence of nanocrystals 210. The enhanced emissions occur because nanocrystals 210 provide an additional mechanism for capture of incident energy that is subsequently emitted at the characteristic emission wavelength of nanocrystals 220.

Step 340 measures a portion of the emission spectrum of tagging system 200. In the exemplary embodiment, for example, step 340 can measure the intensity of red light and the intensity of blue light. Step 350 can then determine the ratio of the intensity of the red emissions under UV stimulation obtained during step 340 to the intensity of red emissions under green stimulation obtained during step 320. The ratio determined in step 350 will be larger for the interacting mixture in tagging system 200 than a similar ratio would be for a non-interacting mixture of the same number of particles or for red-emitting nanocrystals 220 alone. Further, the ratio is dependent on the separation R between nanocrystals involved in energy transfers, so that control of separation R during manufacture can set the ratio to a desired value. The ratio of red emission at the two different excitation wavelengths is a spectral signature that can be made difficult to duplicate. It can be chosen, through use of the appropriate nanocrystals 210 and 220 and control of their average separation, such that no single material can be found that would provide the same response. Similarly, non-interacting mixtures of nanocrystals, which a counterfeiter might create, are also unlikely to provide the same changes in emission spectra as a function of stimulating wavelength. Measurement of a second emission frequency of light in step 340 is optional, but when the amount of energy transfer is less than 100%, measuring the intensity of a second emission frequency (e.g., of blue light) provides another check that the emission spectrum of the tagging system is consistent with a tagging system with energy transfer.

Process 300 is an example of a reading process for a tagging system that is a mixture of two taggants. However, more complicated mixtures of taggants could be used, e.g., mixtures containing more than two types of particles and more than one type of energy transfer. Reading processes for more complex tagging systems can use more than two different illumination wavelengths. For example, a reading process for a tagging system containing N types of taggants can employ measurements with N different illumination wavelengths, each being just above the absorption edge of a different taggant. Measured emissions at more than one wavelength could then be utilized in the reading process to help prevent counterfeiting by making the spectral signature more unique and to improve the signal-to-noise ratios of measurements.

Counterfeiting a mark that utilizes a mixture of nanocrystals within which energy transfers occur generally requires: determining the defining characteristics (e.g., composition, size, shell, and ligand type) of the constituent nanocrystals; duplicating the constituent nanocrystals; and placing the duplicated nanocrystals in the same spatial relationship to one another and in the same spatial location as the authentic mark on the tagged item. These tasks can be difficult. In particular, the specific energy transfer between nanocrystals that occurs in an authentic mark is very challenging to duplicate with sufficient accuracy. This energy transfer is impacted by the absorption and emission characteristics of the nanocrystals, the number of neighboring nanocrystals, the separation R of the nanocrystals, and the number of nanocrystals with defects. The miscibility of the different types of nanocrystals with each other and with any medium in which they are embedded also impacts the separation and distribution of neighboring nanocrystals. All of these parameters depend on difficult to imitate details of the original manufacturing process for the tagging system, such as temperature, pressure, any applied electric or magnetic fields, solvents used, and deposition processes.

An added benefit of a readout process that involves measurement of the emission using multiple excitation wavelengths is that it can provide a better signal-to-noise ratio. This is because the measured intensity of emitted light will depend on the amount of excitation light that is absorbed by the nanocrystals and the fraction of emitted light that is collected by the detector. If the excitation source and detector aren't always placed in the same relation to the mark then there will be variations in the apparent intensity of the emission. However, measurements taken using two or more excitation wavelengths, e.g., measurement steps 320 and 340 in process 300, can be performed with an illumination source and a detector in the same positions, so that variations in absorbance or collection can be normalized out of the result, e.g., when determining the ratio in step 350 of process 300. It may be noted that the ratio of measured intensities will generally depend on a ratio of the intensities of the two illuminations, but the ratio of illumination intensities can be fixed through selection of the source of illumination for the reading process.

Figure 4:
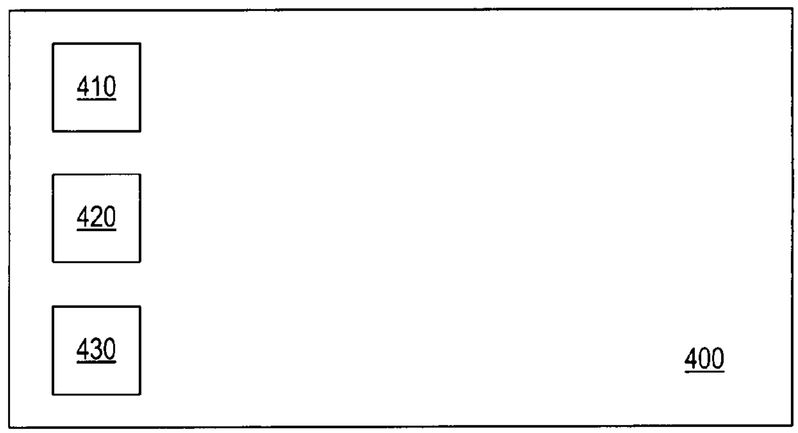
FIG. 4 illustrates a tagged item in accordance with an embodiment of the invention having tagging systems in multiple regions for encoding of information.

FIG. 4 illustrates an item 400 that is tagged with multiple marks 410, 420, and 430 that are spatially separated on item 400. Item 400 may be, for example, a document, a pharmaceutical, a consumer good, or a high value component. Each mark 410, 420, and 430 can be a tagging system of interacting nanocrystals or other taggants as described herein. A system for labeling item 400 may print marks 410, 420, and 430 in the required locations on item 400 using interactive mixtures of nanocrystals or other taggants that encode information related to item 400.

Use of interacting tagging systems as marks 410, 420, and 430 on item 400 can increase the effective density of encoded information, which is an issue if either the process that creates the marks or the detector that reads the marks is limited in terms of the spatial resolution that can be achieved. For example, two types of non-interacting nanocrystals that emit at different wavelengths to record the data provide two bits corresponding to four states that are the possible combinations of presence or absence of each type of nanocrystal. States A, B, C, and D in Table 1 correspond to non-interacting arrangements of none, one, or both of red-emitting nanocrystals NC1 and blue-emitting nanocrystals NC2. State E in Table 1 corresponds to an additional state resulting when both types of nanocrystals NC1 and NC2 are present in a mark in a fully interacting configuration. Accordingly, in this simple example, the availability of a single type of interacting arrangement of nanocrystals NC1 and NC2 provides a 25% increase in encoded data density in a tagging system.

TABLE 1

Mixtures of Two Taggants with Fixed Concentrations

| | | | Short Wavelength Illumination | | Long Wavelength Illumination | |
|---|---|---|---|---|---|---|
| State | NC1 | NC2 | E1S | E2S | E1L | E2L |
| A | 0 | 0 | 0 | 0 | 0 | 0 |
| B | 0 | 1 | 0 | 1 | 0 | 0 |
| C | 1 | 0 | 1 | 0 | 1 | 0 |
| D | 1 | 1 | 1 | 1 | 1 | 0 |
| E (interacting) | 1 | 1 | 2 | 0 | 1 | 0 |

In Table 1, "0" or "1" in the second and third columns indicates absence or presence of NC1 and NC2, respectively. "0", "1", or "2" in the fourth through seventh columns indicates relative intensity of detected emission. "E1S" and "E1L" refer to detection of emission of radiation from nanocrystals NC1 (in the exemplary embodiment, red light) when illuminated by short and long wavelength radiation, respectively. Similarly, "E2S" and "E2L" refer to detection of light emitted at the characteristic emission wavelength of nanocrystals NC2. Here "long wavelength" refers to wavelengths absorbed by nanocrystals NC1 but not nanocrystals NC2. "Short wavelength" refers to wavelengths absorbed by both types of nanocrystals NC1 and NC2.

A multi-frequency readout process, such as process 300, can distinguish the states A, B, C, D, and E and read data encoded by the states in Table 1. For example, a short wavelength illumination is able to excite both red-emitting nanocrystals NC1 and blue-emitting nanocrystals NC2, and a long wavelength illumination is only able to excite red-emitting nanocrystals NC1. The four states A, B, C, and D of non-interacting nanocrystals can be distinguished by whether or not red emissions E1S and/or blue emissions E2S are detected in response to the short wavelength illumination. If state E corresponds to the presence of both types of nanocrystals NC1 and NC2 in a fully interacting (100% energy transfer) configuration, only red emissions are detected, but the red emissions are of greater intensity than the red emissions for state C that similarly has only red emissions. The longer wavelength excitation, which adds no new information for distinguishing states A, B, C, and D, can be used to determine a ratio of red emissions E1S and E1L respectively under short and long illuminating wavelengths to distinguish states C and E.

Table 2 provides another example of encoding where different levels of concentration of nanocrystals NC1 and NC2 may be distinguishable and different levels of interaction can be created though control of the arrangement or spacing of nanocrystals NC1 and NC2. In Table 2, the non-interacting states correspond to distinguishable combinations of respective concentrations A0 and B0 of nanocrystals NC1 and NC2. The interacting states correspond to substantially the same concentration combinations with different levels of energy transfers. In this case, the number of states when energy transfers are allowed increases the data density by a factor about equal to the number of different energy transfer rates used. The non-interacting states corresponding to A0 nanocrystals NC1 and B0 nanocrystals NC2 can be distinguished by detecting intensity levels for red and blue emissions E1S and E2S with short wavelength illumination. When nanocrystals NC1 and NC2 with respective concentrations A0 and B0 are arranged to interact, the emissions E2S of blue light under short wavelength illumination will be less than for a non-interacting state with the same concentrations by a fraction xn that depends on the energy transfer rate. Interacting states can be distinguished through comparison of the intensity of red emissions E1S for short wavelength illumination to the intensity of red emissions E1L for long wavelength illumination. If necessary, in situations where the signal-to-noise ratio is weak, the results can also be checked against the ratios of red to blue emissions for short wavelength excitation. In this example, the quantity fn is a factor that accounts for the fraction of energy transferred to the red-emitting nanocrystals that is converted to red light.

TABLE 2

Mixtures of Two Taggants with Variable Concentrations

| | | | Short Wavelength Illumination | | Long Wavelength Illumination | |
|---|---|---|---|---|---|---|
| State | NC1 | NC2 | E1S | E2S | E1L | E2L |
| No Interaction | A0 | B0 | A0 | B0 | A0 | 0 |
| Interacting 1 | A0 | B0 | A0 + ƒl1B0 | (1 − xl)B0 | A0 | 0 |
| | | | . . . | | | |
| Interacting N | A0 | B0 | A0 + ƒnB0 | (1 − xn)B0 | A0 | 0 |

Figure 5:
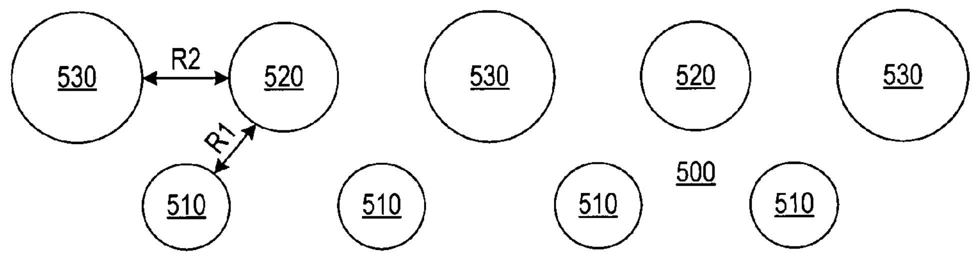
FIG. 5 shows a tagging system in accordance with an embodiment of the invention employing more than two types of particles.

The above embodiments of the invention illustrate the example of tagging systems using interacting configurations of two types of taggants or nanocrystals. However, interacting tagging systems can employ three or more types of taggants or nanocrystals with two or more types of energy transfers. FIG. 5 for example, illustrates a tagging system 500 including three types of nanocrystals 510, 520, and 530 that are arranged to permit energy transfers. In this particular example, nanocrystals 510 have a shortest emission wavelength and associated absorption edge and are arranged at a separation R1 from nanocrystals 520 in order to provide a desired rate of energy transfer between nanocrystals 510 and nanocrystals 520. Nanocrystals 520, which have an emission wavelength and associated absorption edge that are shorter than the emission wavelength and absorption edge of nanocrystals 530, are arranged at a separation R2 between nanocrystals 520 and 530 in order to provide a desired rate of energy transfer between nanocrystals 520 and nanocrystals 530. In this configuration, the intensity of emissions from nanocrystals 530 will increase sharply as the illuminating wavelength becomes shorter than the absorption edge of nanocrystals 520 and again increase when the illuminating wavelength becomes shorter than the absorption edge of nanocrystals 510. A process that uses three illuminating wavelengths but is otherwise similar to process 300 can detect these characteristics of the emission spectrum of tagging system 500 for authentication of or data readout from tagging system 500.

More complex tagging systems involving more types of taggants or nanocrystals or more or different energy transfers can be produced.

The degree of interaction (i.e., the fraction of energy transferred) can be controlled by a variety of means, including the use of passivating ligands of varying length attached to the surface of the nanocrystals or layering of nanocrystals, to control the interparticle spacing.

Figure 6:
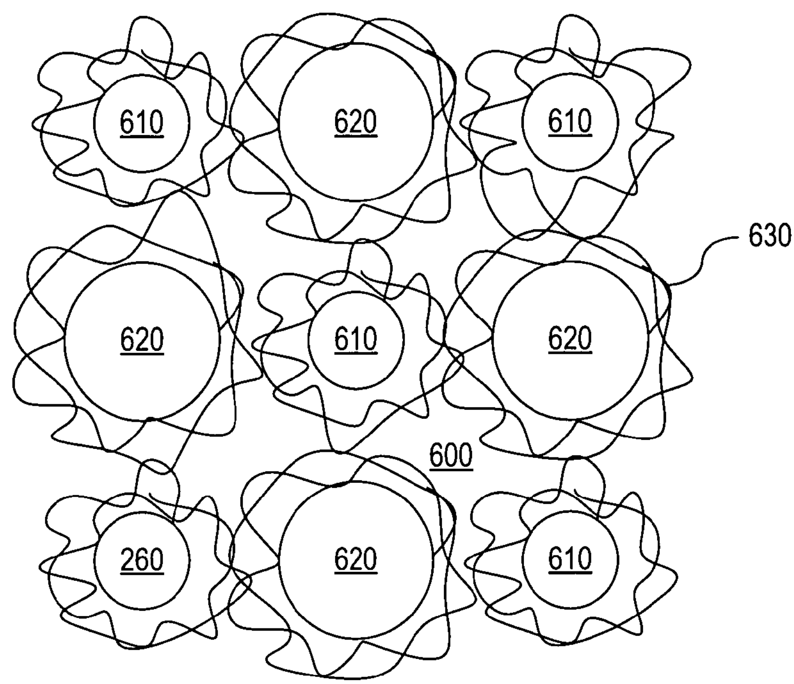
FIG. 6 illustrates a tagging system in accordance with an embodiment of the invention that controls particle spacing by coating ligands or other materials on the particles.

FIG. 6 illustrates a technique for controlling the spacing of taggants 610 and 620 in tagging system 600. With the illustrated technique, one of both types of taggants 610 and 620 are coated with a ligand 630 such as an organic polymer or loligomer. Other types of coatings such as ligands containing alkyl chains radially attached to the surface of the particles might similarly be used. The type and length of ligand 630 control an outward extent or thickness of the coating from nanocrystal 610 or 620 and thereby control the minimum spacing R between adjacent taggants 610 and 620. Tagging system 600 can be constructed by: selecting taggants 610 and 620 for their respective emission spectra and their ability to transfer an excitation from a donor taggant 610 or 620 to an acceptor taggant 620 or 610; coating one or both types of taggants 610 and 620 with ligand 630 or other coating material to control separation of taggants 610 and 620 in tagging system 600, and mixing the coated taggants 610 and 620 to create a two or three-dimensional structure in which the coatings/ligands control the separation of taggants 610. The mixture of taggants 610 and 620 can be applied to a desired location on an item being tagged using, for example, techniques such as inkjet printing, dip-pen lithography, stamping, or drop-casting.

Formation and mixtures of taggants (e.g., taggants 610 and 620 in FIG. 6) can be facilitated through judicious use of manufacturing conditions such as temperature, pressure, applied electric or magnetic fields, solvent drying rates, induced charge on particles, and the hydrophobicity of substrates to control phenomena such as phase-segregation or self-assembly of mixtures of taggants. (See for example, E. V. Shevchenko, "Structural Diversity in Binary Nanoparticle Superlattices", Nature 439, 55 (2006)).

Another possibility is to mix taggants into a mixture of carrier materials that facilitates organization of one particle type with respect to another. For example, the particles could be mixed into a block copolymer in which the nanoparticles have different degrees of miscibility in the different components of the copolymer. (See, for example, M. R. Bockstaller, "Size-Selective Organization of Enthalpic Compatibilized Nanocrystals in Ternary Block Copolymer/Particle Mixtures", J. AM. CHEM. SOC. 125, 5276-5277 (2003)).

Figure 7:
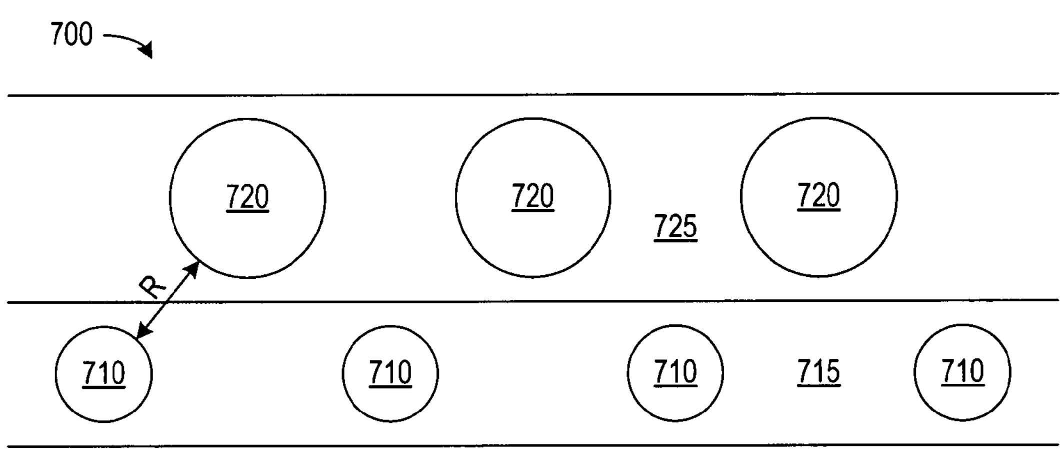
FIG. 7 illustrates a tagging system in accordance with an embodiment of the invention including thin layers containing particles of different types.

Another technique for controlling the separation of nanocrystals in a tagging structure uses thin layers containing nanocrystals. FIG. 7, for example, illustrates a tagging system 700 including taggants 710 and 720 in two layers 715 and 725. Layer 715 includes taggants 710, which may be nanocrystals, and a binding material such as a polymer. Layer 725 includes nanocrystals 720, which may be nanocrystals of a different type, and another binding material. The thicknesses of layers 715 and 725 can be selected so that most nanocrystals 710 in layer 715 will be a desired distance R from a nearest nanocrystal 720 in layer 725, where R is chosen according to the desired energy transfer rates between nanocrystals 710 and 720. In a typical implementation of tagging system 700, taggants 710 and 720 may be between about one nanometer and about 100 nanometers in diameter and layers 715 and 725 can be made about a few nanometers to about 100 nanometers thick. Another possibility is to choose the materials for films 715 and 725 such that the particles 710 and 720 will tend to phase-segregate to the interface between films 715 and 725 and form a bilayer of particles 710 and 720 and a fixed separation.

The above described techniques allow creation of marks with luminescent properties that cannot be obtained from single nanocrystals. In particular, a tagging system utilizing energy transfer can achieve a large difference between the excitation and emission wavelengths, which could make detection, readout, or authentication easier.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A tagging system comprising:

first taggants having a first emission spectrum and a first absorption edge; and second taggants having a second emission spectrum and a second absorption edge, the second absorption edge being different from the first absorption edge, wherein the first taggants are arranged to be within an interaction distance of the second taggants so that energy transfer between the first taggants and the second taggants causes an emission spectrum of the tagging system to differ from a sum of the first emission spectrum and the second emission spectrum.

2. The tagging system of claim 1, wherein the first taggants comprise nanocrystals, and the second taggants comprise nanocrystals.

3. The tagging system of claim 1, wherein:

the first emission spectrum is peaked at a first wavelength;

the second emission spectrum is peaked at a second wavelength that is shorter than the first; and the energy transfer causes the emission spectrum of the tagging system to have enhanced emission of light of the first wavelengths when illuminating light has a wavelength shorter than the second absorption edge.

4. The tagging system of claim 1, wherein the interaction distance is on an order of magnitude of the Förster radius for the first and second taggants.

5. The tagging system of claim 1, wherein at least one of the first taggants and the second taggants have coatings, and thicknesses of the coatings control spacing of the first and second taggants.

6. The tagging system of claim 5, wherein each of the coatings comprises a ligand.

7. The tagging system of claim 1, further comprising a carrier material containing the first taggants and the second taggants.

8. The tagging system of claim 7, wherein the carrier material comprises a block copolymer in which the first and second taggants have different degrees of miscibility in different components of the copolymer.

9. The tagging system of claim 7, wherein spatial arrangement of the first and second taggants is selectable through choice of a manufacturing parameter during manufacture of the tagging system.

10. The tagging system of claim 9, wherein the manufacturing parameter is selected from a group consisting of temperature, pressure, applied electric fields, applied magnetic fields, solvent drying rates, induced charge on the first and second taggants, hydrophobicity of the first and second taggants, a composition of a carrier in which the first and second taggants are contained, and a composition and hydroprobicity of a substrate on which the first and second taggants are applied.

11. The tagging system of claim 1, wherein the first taggants are in a first layer, the second taggants are in a second layer, and thicknesses of the layers control spacing of the first and second taggants.

12. The tagging system of claim 1, wherein the first and second taggants form a bilayer of particles at an interface between a first film and a second film.

13. A method comprising:

selecting an amount of enhancement of an emission spectrum of first taggants at a first illumination wavelength relative to a second illumination wavelength, the amount of enhancement being characteristic of a tag for an item; and applying a mixture of the first taggants and second taggants to the item, wherein application controls spacing of the first taggants and the second taggants to create energy transfers that cause the selected amount of enhancement of the emission spectrum of the first taggants.

14. The method of claim 13, wherein the first taggants comprise first nanocrystals, and the second taggants comprise second nanocrystals.

15. The method of claim 13, wherein the energy transfers comprise Förster exchange.

16. The method of claim 13, wherein the energy transfers comprise Dexter exchange.

17. The method of claim 13, wherein applying the mixture comprises controlling a manufacturing parameter that affects the spacing, wherein the manufacturing parameter is selected from a group consisting of temperature, pressure, an applied electric field, an applied magnetic field, a solvent drying rate, induced charge on the first and second taggants, hydrophobicity of the first and second taggants, and hydrophobicity of the substrate.

18. A method for reading a tagging system containing first taggants and second taggants, comprising:

illuminating the tagging system with light having a first wavelength that is shorter than a first absorption edge of the first taggants and longer than a second absorption edge of the second taggants;

measuring a portion of a first emission spectrum that results from illuminating the tagging system with the first wavelength of light;

illuminating the tagging system with light having a second wavelength of light that is shorter than the second absorption edge;

measuring a portion of a second emission spectrum that results from illuminating the tagging system with the second wavelength of light; and comparing measurements of the portions of the first emission spectrum and the second emission spectrum to detect changes in emission response caused by energy transfers between the first and second taggants.

19. The method of claim 18, wherein comparing the measurements comprises determining a ratio of an intensity of light at a first wavelength in the first emission spectrum to an intensity of light at the first wavelength in the second emission spectrum.

20. The method of claim 18, wherein comparing the measurements comprises comparing emissions at different frequencies.

21. The method of claim 18, wherein comparing the measurements further comprises determining a rate of energy transfer between the first and second taggants.

* * * * *